US010338534B2

(12) United States Patent
Germiquet et al.

(10) Patent No.: US 10,338,534 B2
(45) Date of Patent: Jul. 2, 2019

(54) SEMI-IMPERMEABLE CLOSURE DEVICE

(71) Applicant: THE SWATCH GROUP RESEARCH AND DEVELOPMENT LTD, Marin (CH)

(72) Inventors: Christophe Germiquet, Preles (CH); Michael Stalder, Bienne (CH)

(73) Assignee: The Swatch Group Research and Development Ltd, Marin (CH)

( * ) Notice: Subject to any disclaimer, the term of this patent is extended or adjusted under 35 U.S.C. 154(b) by 82 days.

(21) Appl. No.: 15/310,320

(22) PCT Filed: Jun. 17, 2015

(86) PCT No.: PCT/EP2015/063585
§ 371 (c)(1),
(2) Date: Nov. 10, 2016

(87) PCT Pub. No.: WO2015/193368
PCT Pub. Date: Dec. 23, 2015

(65) Prior Publication Data
US 2017/0269554 A1 Sep. 21, 2017

(30) Foreign Application Priority Data
Jun. 20, 2014 (EP) .................................... 14173291

(51) Int. Cl.
G01C 5/00 (2006.01)
H01M 2/12 (2006.01)
(Continued)

(52) U.S. Cl.
CPC ............ G04B 37/08 (2013.01); G04B 37/00 (2013.01); G04B 47/066 (2013.01); G04G 21/02 (2013.01);
(Continued)

(58) Field of Classification Search
CPC ...... G04B 37/00; G04B 37/08; G04B 47/066; G04B 37/0008; F16K 1/16; F16K 27/00;
(Continued)

(56) References Cited

U.S. PATENT DOCUMENTS 4,262,062 A * 4/1981 Zatsky .................. G04C 10/00
429/110
5,500,835 A * 3/1996 Born ...................... G04C 3/146
368/11
(Continued)

FOREIGN PATENT DOCUMENTS

EP 0 670 532 A1 9/1995
FR 2 478 881 A1 9/1981
(Continued)

OTHER PUBLICATIONS

International Search Report dated Jan. 22, 2016, in PCT/EP2015/063585, filed Jun. 17, 2015.

Primary Examiner — Randy W Gibson
Assistant Examiner — Gedeon M Kidanu
(74) Attorney, Agent, or Firm — Oblon, McClelland, Maier & Neustadt, L.L.P.

(57) ABSTRACT

A portable object includes a case forming a housing inside which is arranged a device that requires air to operate, and a closure device including at least one permeable element. The closure device is arranged to provide impermeability to liquids while allowing the atmosphere inside the housing to communicate with the external atmosphere. The case comprises a recess in which a through opening is made, the recess being closed by the closure device. The closure device includes a permeable module mounted to move such that, in a gaseous environment, the permeable module is in a rest position allowing gases to penetrate the case opening through the permeable module, and in a liquid environment, the permeable module is in an operating position in which
(Continued)

gases and liquids are blocked. The permeable module comprises a tubular support at the end of which is fixed a membrane.

9 Claims, 4 Drawing Sheets

(51) Int. Cl.
*G04B 37/00* (2006.01)
*G04B 37/08* (2006.01)
*G04B 47/06* (2006.01)
*G04G 21/02* (2010.01)
*H01M 12/08* (2006.01)

(52) U.S. Cl.
CPC ............. *G01C 5/00* (2013.01); *H01M 2/1223* (2013.01); *H01M 12/085* (2013.01)

(58) Field of Classification Search
CPC ....... F16K 27/0209; G01C 5/00; G04C 10/00; G04G 21/02; H01M 12/085; H01M 2/1223

See application file for complete search history.

(56) References Cited

U.S. PATENT DOCUMENTS

| | | | |
|---|---|---|---|
| 7,600,430 B2 | 10/2009 | Palin et al. | |
| 2007/0183264 A1* | 8/2007 | Raeber | ................... B63C 11/32 368/11 |

FOREIGN PATENT DOCUMENTS

| | | | | |
|---|---|---|---|---|
| GB | 2 432 923 A | 6/2007 | | |
| MX | 9909410 A | 7/2000 | | |
| WO | WO 9847191 A1 * | 10/1998 | ........... | G04B 37/081 |
| WO | WO 0036692 A1 * | 6/2000 | ............. | H01M 2/10 |

* cited by examiner

SEMI-IMPERMEABLE CLOSURE DEVICE

The present invention concerns a portable object including a case forming a housing, inside which is arranged a device that requires air to operate.

PRIOR ART

There are known portable objects, such as watches or mobile telephone devices or touch tablets, which are considered to be waterproof to allow for use in an aquatic environment. To this end, said portable object is provided with a multitude of gaskets or solutions for ensuring virtually perfect impermeability both to gases and to liquids. In horology, gaskets are generally used to provide a seal between two moving parts, for example the winding button and the winding stem, or between two fixed parts, for example the case back and case middle.

Thus, for diving, gaskets must be impermeable to helium since molecules that are smaller than oxygen molecules pass through the gasket. When the diver ascends, helium contained inside the watch is degassed which will result in overcompression. If no helium release device is provided, the watch will generally lose its crystal which is not devised to withstand internal pressure.

However, there are applications in which this virtually perfect impermeability is a drawback. Indeed, in altimeter type applications or where a zinc air power supply is used, an air flow must be allowed between the housing of the portable object, in which the altimeter device and/or the zinc air power supply are arranged, and the exterior of the portable object.

While such objects exist, it is necessary to maintain the impermeability of said device.

It is also known to use membranes made of Gore-Tex® material. This material is known to be porous, i.e. it has a multitude of pores of such small size that it allows gases to pass through while blocking liquids.

However, this material has a drawback. Indeed, a membrane made of Gore-Tex® type material will only be waterproof to a limited depth of 15 to 40 m. Beyond this depth, water bubbles shrink under pressure which then allows water to pass through the pores making the material permeable.

SUMMARY OF THE INVENTION

It is therefore an object of the present invention to overcome the drawbacks of the prior art by providing a portable object including a semi-impermeable device, i.e. which allows gases to pass through but not liquids and which can be used at depths of more than 100 m.

To this end, the invention concerns a portable object comprising a case forming a housing, inside which is arranged a device that requires air to operate, said portable object further comprising a closure device comprising at least one permeable element, said closure device being arranged to provide impermeability to liquids while allowing the atmosphere inside the housing to communicate with the external atmosphere, characterized in that said case is composed of a first part and a second part attached to each other, the closure device further comprising a gasket made of a semi-permeable material.

In an advantageous embodiment, said gasket is made of silicon.

The invention also concerns a portable object comprising a case forming a housing inside which is arranged a device that requires air to operate, said portable object further comprising a closure device comprising at least one permeable element, said closure device being arranged to provide impermeability to liquids while allowing the atmosphere inside the housing to communicate with the external atmosphere, characterized in that said case has a through opening, the closure device comprising a semi-permeable membrane located opposite said opening, said semi-permeable membrane comprising a porous support on which is fixed a film that is permeable to gases and impermeable to liquids, the thickness of said film making it possible to change the time constant for equilibration of gases between the interior and exterior of the portable object.

In an advantageous embodiment, the film is a polymer.

In another advantageous embodiment, said case comprises, on its inner wall, a recess inside which the closure device is placed, said recess having a lateral wall comprising a groove extending along said lateral wall and used for holding said membrane, said membrane also being held pressed onto the inner wall by holding means composed of a cover and said closure device further comprises a gasket inserted between said cover and the membrane.

The invention finally concerns a portable object comprising a case forming a housing inside which is arranged a device that requires air to operate, said portable object further comprising a closure device comprising at least one permeable element, said closure device being arranged to provide impermeability to liquids while allowing the atmosphere inside the housing to communicate with the external atmosphere, characterized in that said case comprises a recess in which a through opening is made, said recess being closed by said closure device and in that said closure device comprises a permeable module mounted to move such that, in a gaseous environment, the permeable module is in a rest position allowing gases to penetrate said case opening through said permeable module and such that, in a liquid environment, the permeable module is in an operating position in which gases and liquids are blocked.

In a first advantageous embodiment, said permeable module comprises a tubular support at the end of which is fixed a membrane, the support being mounted, in a suspended manner, by means of a flexible gasket.

In a second advantageous embodiment, said membrane is selected to be permeable.

In a third advantageous embodiment, the closure device is arranged on an external wall of said portable object.

In a fourth advantageous embodiment, the closure device is arranged on an internal wall of said portable object.

In a fifth advantageous embodiment, said device requiring air to operate is a zinc air battery.

In a sixth advantageous embodiment, said device requiring air to operate is an altimeter.

In a seventh advantageous embodiment, the closure device renders said portable object impermeable to a depth of at least 100 m.

BRIEF DESCRIPTION OF THE DRAWINGS

The objects, advantages and features of the device according to the present invention will appear more clearly in the following detailed description of at least one embodiment of the invention, given solely by way of non-limiting example and illustrated by the annexed drawings, in which.

DETAILED DESCRIPTION

Figure 1:
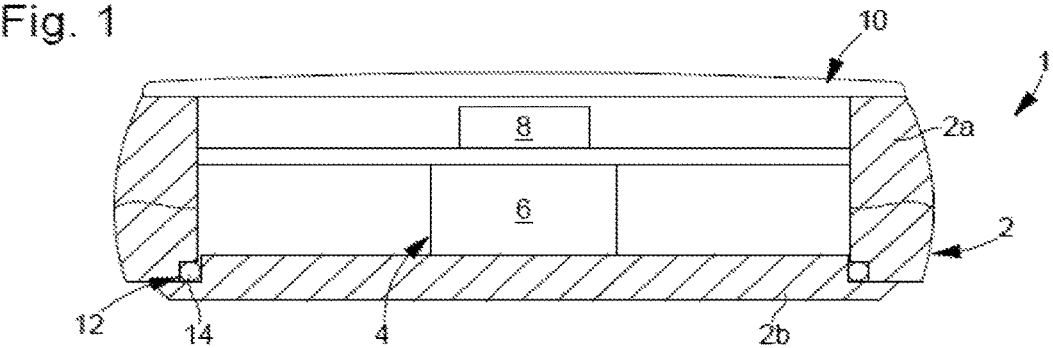
FIG. 1 is a schematic view of a first variant of a first embodiment of the portable object according to the invention.

A portable object 1 according to the present invention is represented in FIGS. 1 to 5. This portable object 1 may take the form of a timepiece or a mobile telephone or a smart phone or a touch tablet.

Portable object 1 includes a case 2 forming a housing inside which is arranged a device 4 that requires air to operate.

In a first embodiment seen in FIGS. 1 to 3c, device 4 requiring air to operate is an electric battery 6. This battery is, for example, of the zinc air type, i.e. it uses oxygen from the air to oxidise the metal of which it is formed and to supply electricity. The zinc air battery must be supplied with air otherwise it will dry out and lose performance.

This electric battery is used to operate an electronic system 8 associated with display means 10. Electronic system 8 may also comprise control means and/or communication means.

Advantageously according to the invention, the portable object is also provided with a closure device 12 enabling the battery to be supplied with air while ensuring that the portable object is impermeable to liquids, this impermeability being able to achieve depths of more than 100 meters.

In a first variant seen in FIG. 1, case 2 of the portable object comprises at least a first part 2a and a second part 2b such as a case middle 2a closed by a back cover 2b. Display means 10, such as a digital screen or a dial/crystal assembly, may form a third part. Closure device 12 then comprises a gasket 14 placed between the first part 2a and second part 2b.

This gasket 14 is selected to be made of a semi-permeable material, i.e. a material that allows gas to pass through but blocks liquids. This material may be a polymer. Indeed, gases pass through dense polymer films by a process of "dissolution-diffusion". The application of a gas pressure gradient (drive force) between the upstream face (under overpressure) and downstream face (under depression) of the membrane causes the following three successive phenomena:

Absorption of gas at the upstream surface,

Molecular dissolution and diffusion of the gas in the material

Desorption of the gas from the downstream surface.

One material used for this type of application is silicone. At ambient temperature, silicones exhibit, on average, a gas permeability that is 10 times greater than that of natural rubber, but become closer around 100 to 150° C.

This configuration therefore associates the small gap between first part 2a and second part 2b, and gasket 14 made of semi-permeable material, to allow a small quantity of air to pass from the exterior of the portable object to the interior. In this case, the time constant necessary to balance the gases between the interior and exterior of the portable object is on the order of several days. It is thus understood that this variant can be used for the operation of a portable object 1 using little electricity and thus requiring little air, such as, for example, a watch with three hands displaying only the time, which uses a few microamperes.

Figure 2:
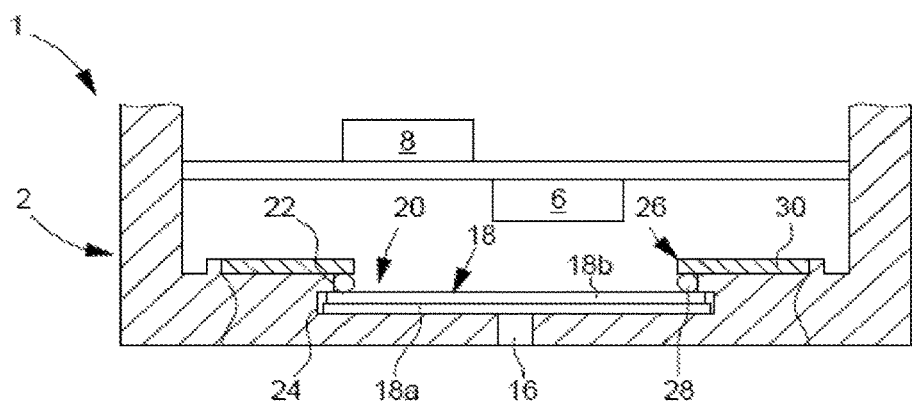
FIG. 2 is a schematic view of a second variant of a first embodiment of the portable object according to the invention.

In a second variant seen in FIG. 2, case 2 of the portable object is arranged to include an opening 16 allowing a large volume of air to pass through, having, for example, a diameter of 5 mm, and located in the case back. In such case, closure device 12 comprises a high density membrane 18 placed inside the case. To this end, the inner wall of the case comprises, at the opening, a recess 20 for high-density membrane 18. This recess has a lateral wall 22. This lateral wall has a groove 24 extending along the lateral wall. The groove is used for holding said high-density membrane. The high-density membrane is held by holding means 26 composed of a gasket 28 and a cover 30. Cover 30 is attached to the inner case wall so that gasket 28 is inserted between said cover 30 and high-density membrane 18.

The high-density membrane 18, also called a "supported membrane" or "composite membrane" is composed of a film 18a, made of a polymer material that retains water 100% but is permeable to gases, like all plastics.

Thus, in order to use film 18a, it must be deposited on a support 18b which is also a membrane but much thicker. This support membrane 18b is porous so that air can pass through; the only function of support membrane 18b is mechanical, since its only object is to act as a support for polymer film 18a. For example, a support membrane made of Gore-Tex® may be used. Consequently, the drawback of Gore-Tex® membranes is overcome, since film 18a will ensure impermeability to liquids even at great depths.

To regulate the air flow passing through high-density membrane 18, the parameter to act on is the thickness of film 18a. The thinner film 18a, the greater the flow will be, but also the more fragile film 18a will be and vice versa.

Typically, to have a time constant for equilibration of gases between the interior and exterior of the portable object on the order of a minute, the thickness of film 18a must be on the order of 10 micrometers.

This feature enables high-density membrane 18 to be used in a portable object having a relatively high electrical energy consuming electronic system, around 50 milliamperes, this power consumption may be due to the use of digital sensors or screens or Bluetooth® type communication means.

Figure 3A:
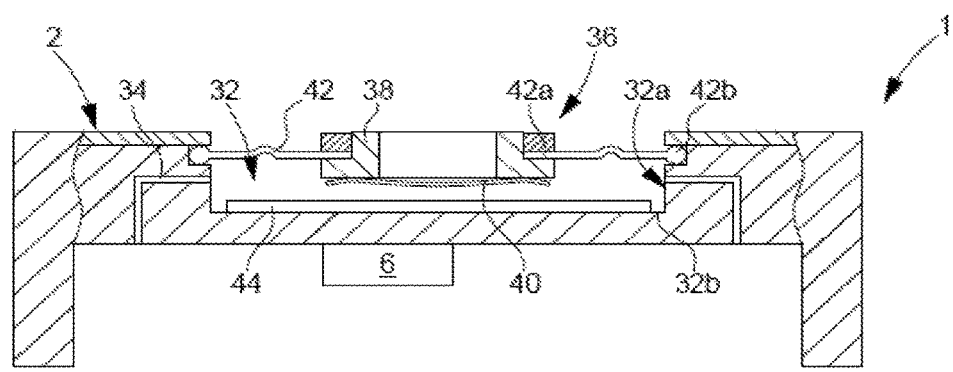
FIGS. 3a to 3c are schematic views of a third variant of a first embodiment of the portable object according to the invention.

In a third variant seen in FIG. 3a, case 2 of the portable object comprises, on its external wall, a recess 32 inside which is arranged closure device 12. An opening 34 is arranged in recess 32. Closure device 12 takes the form of a permeable module 36 mounted to be movable.

Indeed, closure device 12, i.e. permeable module 36, comprises a support 38 taking the form of an open tubular piece, at the end of which is attached a membrane 40. Support 38 is mounted in a suspended manner by means of a flexible gasket 42. In the case of a circular tubular support 38, flexible gasket 42 is also circular. The inner edge 42a of flexible gasket 42 is attached to tubular piece 38, whereas the outer edge 42b is attached to lateral wall 32a of recess 32.

Membrane 40 closing one of the ends of tubular support 38 is located at the end of the tubular support facing the recess and is made of a permeable material. One material used is Gore-Tex® which has the feature of allowing gases to pass through and retaining liquids up to a pressure of 1 bar.

Closure device 12 operates as follows. When the portable object is in the open air, air passes through permeable membrane 40 and penetrates opening 34 of case 2 so that battery 6 can provide electrical energy. Permeable module 36 is then in a first position, or rest position, in which no external stress is applied on flexible gasket 42.

When a portable object 1 is immersed, water then exerts pressure and therefore a mechanical force on membrane 40 of tubular support 38. This mechanical force on membrane 40 causes a deformation of flexible gasket 42. The deformation of flexible gasket 42 permits a movement of permeable module 36 and therefore of tubular support 38, so that it moves and enters into contact with the bottom of the recess, i.e. into a second position or operating position. In such case, membrane 40 enters into contact with bottom 32b. This contact between permeable membrane 40 and bottom 32b of recess 32, i.e. the case, results in closure of the passage, even under a high pressure of 10 bars.

The advantage of such a closure device is that it can provide a time constant for equilibrium of the gases between the interior and exterior of the portable object on the order of a second, i.e. the flow of air is large while still ensuring the impermeability of the portable object.

In a first variant of this third embodiment, bottom 32b of the recess is provided with a second gasket 44 called a flat gasket. Flat gasket 44 is used to improve the blocking of water ingress. Indeed, this flat gasket 44 is made of a plastic type material, such as a polymer or rubber. The function of flat gasket 44 is to completely block the pores of the membrane.

In a second variant of this third embodiment, an absorber such as, for example, silica gel is used in addition to the membrane. The absorber is used to reduce the importance of relative humidity variations in a watch. The quantity of absorber can be determined according to the volume of the watch so that the permeability to humidity of the latter is equivalent to that obtained with conventional gaskets.

Figure 3B:
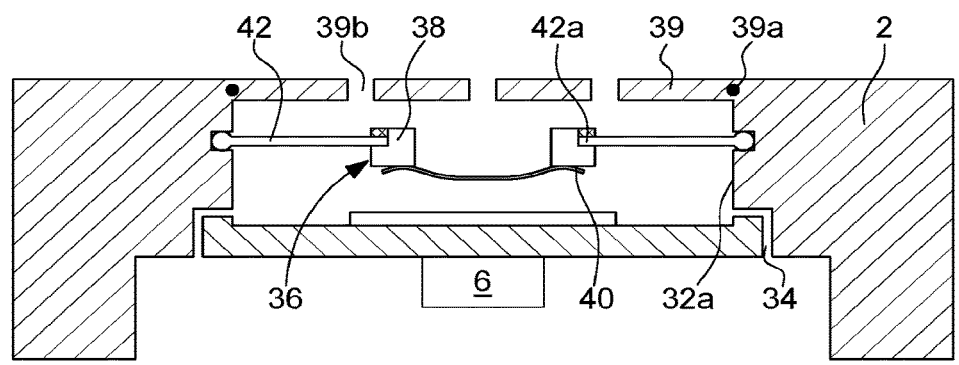

In a third variant of this third embodiment, closure device 12 is arranged to be invisible. To this end, recess 32 seen in FIG. 3b is closed by a cap 39, this cap being pierced with at least one aperture 39b allowing water to penetrate to act on permeable module 36. This variant advantageously allows closure device 12 to be protected against any shocks that may occur. To ensure the impermeability of said cap, a gasket 39b is used.

Figure 3C:
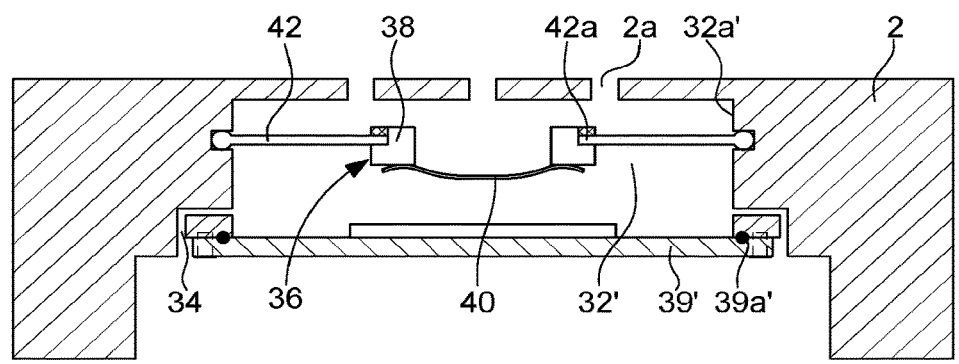

Of course, it is possible for recess 32 to be arranged on the inner wall of case 2. Case 2 is thus arranged to have on its inner wall a recess 32', provided with a lateral wall 32a' on which is arranged movably mounted permeable module 36, as seen in FIG. 3c. Holes 2a are arranged to allow air or a liquid to be in contact with permeable module 36.

Indeed, closure device 12, i.e. permeable module 36, comprises a support 38 taking the form of an open tubular piece, at the end of which is attached a membrane 40. Support 38 is mounted in a suspended manner by means of a flexible gasket 42. The inner edge 42a of flexible gasket 42 is attached to tubular piece 38, whereas the outer edge 42b is attached to lateral wall 32a' of recess 32'.

Recess 32' is then closed by a cap 39' mounted on the inner face of case 2, the cap permitting cooperation with membrane 40 so that, when portable object 1 is immersed, water will then exert pressure and thus a mechanical force on membrane 40 causing a deformation of flexible gasket 42. This deformation of flexible gasket 42 allows permeable module 36 to move and enter into contact with said cap acting as the bottom of the recess.

Cap 39' may be secured by a screw thread directly incorporated in said cap 39' or by screws and a gasket 39a'.

Figure 4:
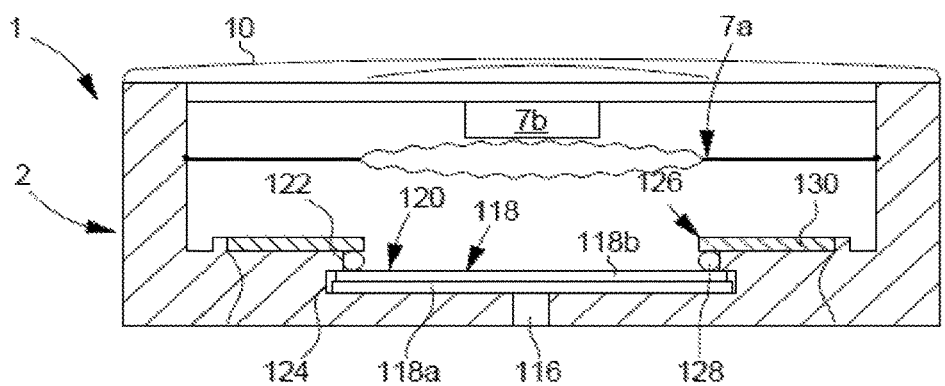
FIG. 4 is a schematic view of a first variant of a second embodiment of the portable object according to the invention.
Figure 5A:
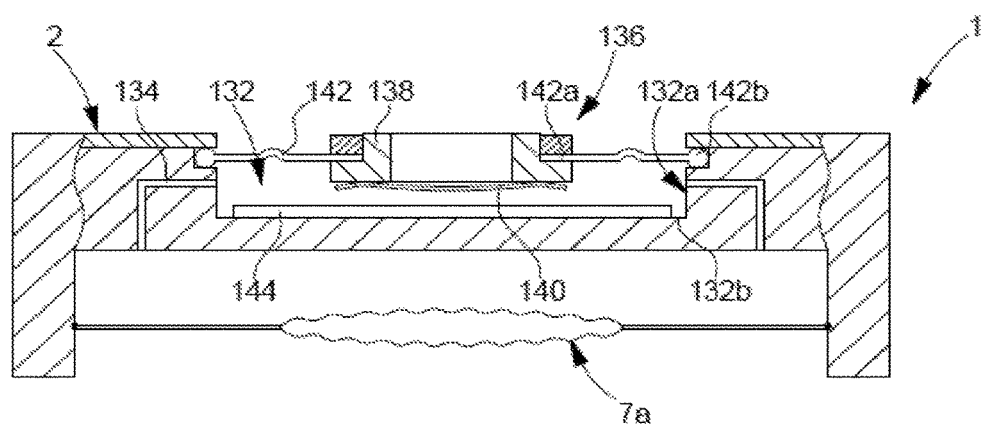
FIGS. 5a to 5c are schematic views of a second variant of a second embodiment of the portable object according to the invention.
Figure 5B:
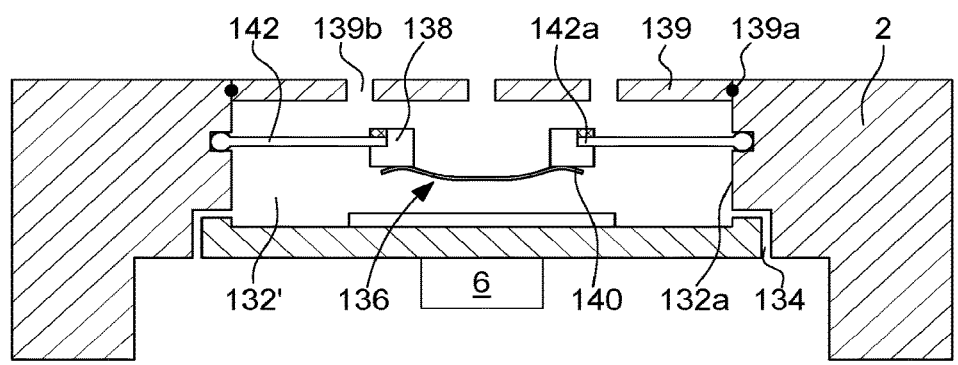
Figure 5C:
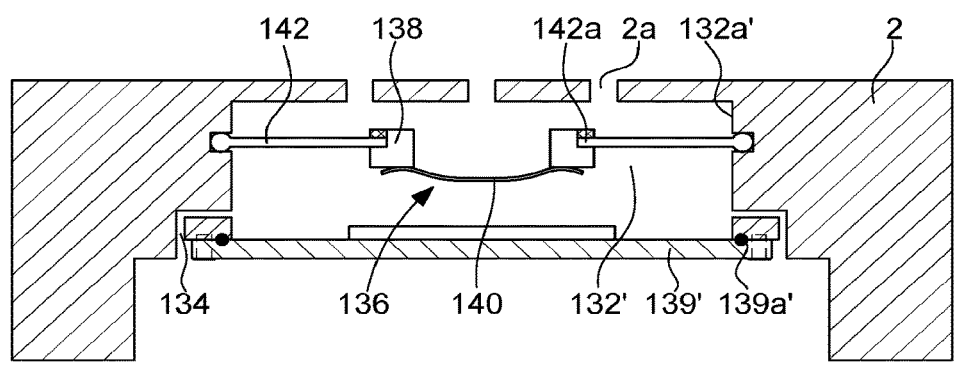

In a second advantageous embodiment seen in FIGS. 4 to 5c, the device requiring air for operation 4 is an altimeter 7. Altimeter 7 may be mechanical or electronic and includes a deformable membrane 7a.

In the case of a mechanical altimeter, the latter includes a transmission mechanism 7b. Membrane 7a is capable of deforming mechanically under the effect of external pressure acting in that case on transmission device 7b. Transmission mechanism 7b thus transfers said movement of deformation from membrane 7a, representing pressure, to display means 10 which display the altitude value.

In the case of an electronic altimeter (not represented), the latter includes a transmission circuit 7c. Membrane 7a is capable of deforming mechanically under the effect of external pressure acting in that case on transmission circuit 7c. Transmission circuit 7c is an interface allowing the deformation of the membrane to be converted into an electrical signal. This electrical signal is processed so that display means 10 can use the signal to display altitude information.

Advantageously according to the invention, portable object 1 is also provided with a closure device 12 allowing air to penetrate the housing of the portable object to interact with membrane 7a of the altimeter without water penetrating.

In a first variant seen in FIG. 4, case 2 of the portable object is arranged to include an opening 116 allowing a large volume of air to pass through, having, for example, a diameter of 5 mm, and located in the case back. In such case, closure device 12 comprises a high density membrane 18 placed inside case 2. To this end, the inner wall of the case comprises, at the opening, a recess 120 for high-density membrane 118. This recess 120 has a lateral wall 122. Lateral wall 122 has a groove 124 extending along lateral wall 122. Groove 124 is used for holding said high-density membrane 118. High-density membrane 118 is held by holding means 126 composed of a gasket 128 and a cover 130. Cover 130 is attached to the inner case wall so that gasket 128 is inserted between said cover 130 and high-density membrane 118.

The high-density membrane 118, also called a "supported membrane" or "composite membrane" is composed of a film 118a, made of a polymer material that retains water 100% but is permeable to gases, like all plastics.

Thus, in order to use film 118a, it must be deposited on a support 118b which is also a membrane but much thicker. This support membrane 118b is porous so that air can pass through; the only function of support membrane 118b is mechanical, since its only object is to act as a support for polymer film 118a. For example, a support membrane 118b made of Gore-Tex® may be used.

To regulate the air flow passing through high-density membrane 118, the parameter to act on is the thickness of film 118a. The thinner film 118a, the greater the flow will be, but also the more fragile film 118a will be and vice versa.

Typically, to have a time constant for equilibration of gases between the interior and exterior of the portable object on the order of a minute, the thickness of film 118a must be on the order of 10 micrometers.

This feature allows high density membrane 118 to be used for an altimeter since the equilibration time is relatively short. A short equilibration time allows the user to quickly obtain the required altitude value.

In a second variant seen in FIG. 5a, case 2 of the portable object comprises, on its external wall, a recess 132 inside which is arranged closure device 12 and an opening arranged in the recess.

Indeed, closure device 12, i.e. permeable module 136, comprises a support 138 taking the form of an open tubular piece, at the end of which is attached a membrane 140. Support 138 is mounted in a suspended manner by means of a flexible gasket 142. In the case of a circular tubular support 138, flexible gasket 142 is also circular. The inner edge 142a of flexible gasket 142 is attached to tubular piece 138, whereas the outer edge 142b is attached to lateral wall 132a of recess 132.

Membrane 140 closing one of the ends of tubular support 38 is located at the end of the tubular support facing the recess and is made of a permeable material. One material used is Gore-Tex® which has the feature of allowing gases to pass through and retaining liquids up to a pressure of 1 bar.

Closure device 12 operates as follows. When the portable object is in the open air, air passes through permeable membrane 140 and penetrates opening 134 of case 2 so that the altitude measurement can be made by membrane 7a. Permeable module 136 is then in a first position, or rest position, in which no external stress is applied on flexible gasket 142.

When a portable object 1 is immersed, water then exerts pressure and therefore a mechanical force on membrane 140 of tubular support 138. This mechanical force on membrane 140 causes a deformation of flexible gasket 142. The deformation of flexible gasket 142 permits a movement of permeable module 136 and therefore of tubular support 38, so that the latter moves and enters into contact with the bottom of the recess, i.e. into a second position or operating position. In such case, membrane 140 enters into contact with bottom 132b. This contact between permeable membrane 140 and bottom 132b of recess 132, i.e. the case, results in closure of the passage, even under a high pressure of 10 bars.

The advantage of such a closure device is that it can provide a time constant for equilibration of the gases between the interior and exterior of the portable object on the order of a second, i.e. the flow of air is large while still ensuring the impermeability of the portable object. Consequently, the altitude measurement is fast so that the user does not have to wait long to have the exact measured altitude.

In a first variant of this second embodiment, bottom 132a of recess 132 is provided with a second gasket 144 called a flat gasket. Flat gasket 144 is used to improve the blocking of water ingress. Indeed, this flat gasket 144 is made of a plastic type material, such as a polymer or rubber. The function of flat gasket 144 is to completely block the pores of the membrane.

In a second variant of this second embodiment, an absorber such as, for example, silica gel is used in addition to the membrane. The absorber is used to reduce the importance of relative humidity variations in a watch. The quantity of absorber can be determined according to the volume of the watch so that the permeability to humidity of the latter is equivalent to that obtained with conventional gaskets.

In a third variant of this second embodiment, closure device 12 is arranged to be invisible. To this end, recess 132 seen in FIG. 5b is closed by a cap 139, this cap being pierced with at least one aperture 139b allowing water to penetrate to act on permeable module 136. This variant advantageously allows closure device 12 to be protected against any shocks that may occur. To ensure the impermeability of said cap, a gasket 139b is used.

Of course, it is possible for the recess to be arranged on the inner wall of case 2. Case 2 is thus arranged to have on its inner wall a recess 132', provided with a lateral wall 132a' on which is arranged movably mounted permeable module 136, as seen in FIG. 5c. Holes 2a are arranged to allow air or a liquid to be in contact with permeable module 136.

Indeed, closure device 12, i.e. permeable module 136, comprises a support 138 taking the form of an open tubular piece, at the end of which is attached a membrane 140. Support 138 is mounted in a suspended manner by means of a flexible gasket 142. The inner edge 142a of flexible gasket 142 is attached to tubular piece 138, whereas the outer edge 142b is attached to lateral wall 132a' of recess 132'.

Recess 132' is then closed by a cap 139' mounted on the inner face of case 2, the cap permitting cooperation with membrane 140 so that, when portable object 1 is immersed, water will then exert pressure and thus a mechanical force on membrane 140 causing a deformation of flexible gasket 142. This deformation of flexible gasket 142 allows permeable module 136 to move and enter into contact with said cap acting as the bottom of the recess.

Cap 139' may be secured by a screw thread directly incorporated in said cap 139' or by screws and a gasket 139a'.

It will be clear that various alterations and/or improvements evident to those skilled in the art may be made to the various embodiments of the invention described in this description without departing from the scope of the invention.

The invention claimed is:
1. A portable object, comprising:
   a case forming a housing inside which is arranged a device that requires air to operate; and
   a closure device comprising at least one permeable element, wherein
   said closure device is arranged to provide impermeability to liquids while allowing the atmosphere inside the housing to communicate with the external atmosphere,
   said case comprises a recess in which a through opening is made, said recess being closed by said closure device,
   said closure device comprises a permeable module including a tubular support and a permeable membrane mounted on the tubular support, and a flexible gasket fixed at a first end to said recess and fixed at a second end to the tubular support to mount the tubular support in a suspended manner by the flexible gasket, the flexible gasket being configured to deform to move said tubular support and said permeable membrane between,
      a rest position in which the permeable membrane is spaced apart from a bottom of the recess such that, in a gaseous environment, gases are allowed to penetrate said case opening through said permeable module, and
      an operating position in which the permeable membrane is in contact with the bottom of the recess such that, in a liquid environment, gases and liquids are blocked from penetrating through said permeable module.
2. The portable object according to claim 1, wherein said membrane is selected to be permeable.
3. The portable object according to claim 1, wherein the closure device is arranged on an external wall of said portable object.
4. The portable object according to claim 1, wherein the closure device is arranged on an internal wall of said portable object.
5. The portable object according to claim 1, wherein said device requiring air to operate is a zinc air battery.

6. The portable object according to claim 1, wherein said device requiring air to operate is an altimeter.

7. The portable object according to claim 1, wherein the closure device renders said portable object impermeable to a depth of at least 100 m.

8. The portable object according to claim 1, wherein the permeable membrane is in contact with flat gasket on the bottom of the recess in the operating position.

9. The portable object according to claim 1, wherein the permeable membrane is in contact with a cap on the bottom of the recess in the operating position.

* * * * *